United States Patent [19]

Ishii et al.

[11] 4,396,957
[45] Aug. 2, 1983

[54] TAPE CONTROL SYSTEM FOR USE IN AN AUTOMATIC PROGRAM LOCATING SYSTEM FOR TAPE PLAYER

[75] Inventors: Shouichi Ishii, Warabishi; Masanobu Shimanuki, Yokohamashi, both of Japan

[73] Assignee: Tokyo Shibaura Denki Kabushiki Kaisha, Kawasaki, Japan

[21] Appl. No.: 211,189

[22] Filed: Nov. 28, 1980

[30] Foreign Application Priority Data

Feb. 29, 1980 [JP] Japan .................................. 55-25150

[51] Int. Cl.³ ............................................. G11B 15/18
[52] U.S. Cl. ................................... 360/72.1; 360/74.4
[58] Field of Search .................... 360/72.1, 73, 74.1, 360/74.4, 71, 69

[56] References Cited

U.S. PATENT DOCUMENTS

| | | | |
|---|---|---|---|
| Re. 30,416 | 10/1980 | Yasunaga | 360/72.1 |
| 3,541,271 | 11/1970 | Joslow et al. | 360/72.1 |
| 3,984,869 | 10/1976 | Fujii et al. | 360/73 |
| 4,014,039 | 3/1977 | Yasunaga | 360/72.1 |
| 4,115,821 | 9/1978 | Okada | 360/72.1 |
| 4,241,364 | 12/1980 | Shiga | 360/72.1 |

Primary Examiner—John H. Wolff
Attorney, Agent, or Firm—Finnegan, Henderson, Farabow, Garrett & Dunner

[57] ABSTRACT

A tape control system for use in an automatic program locating system for tapeplayers. The tape control system is responsive to blank or unrecorded spaces between recorded programs and includes a presettable shift register having a succession of bit stages for indicating one or more desired programs to be located and reproduced. The contents of the bit stages are shifted to the next successive bit stage upon every occurrence of a space detection signal generated in response to each sensed unrecorded space on the tape. The outputted content of the last bit stage in the succession is provided to an output-content detection circuit which controls tape speed shifting circuits to shift the tape speed into a normal playback speed or into a fast movement speed in response whether the output of the last bit stage indicates that a selected program is to be read next by the heads of the tapeplayer.

21 Claims, 10 Drawing Figures

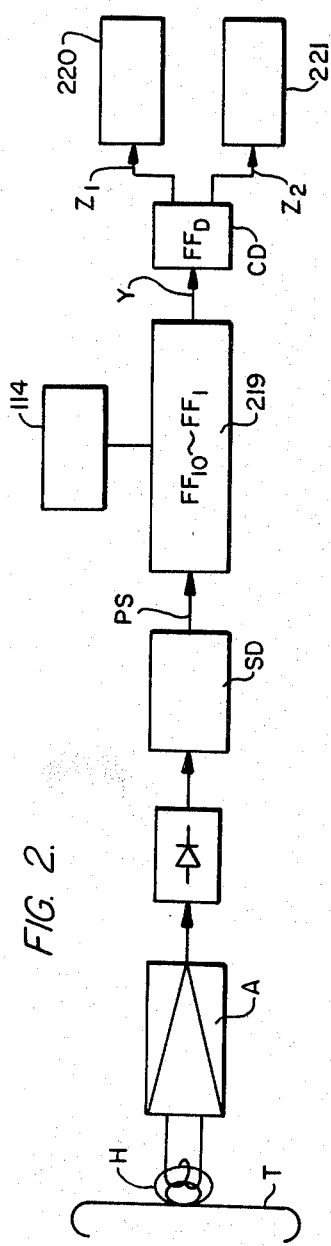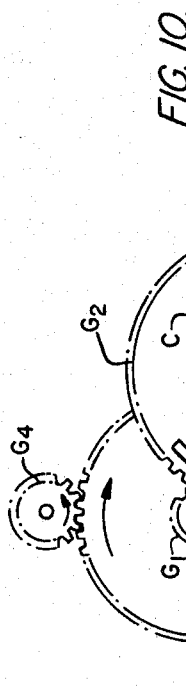
FIG. 2.
FIG. 10.

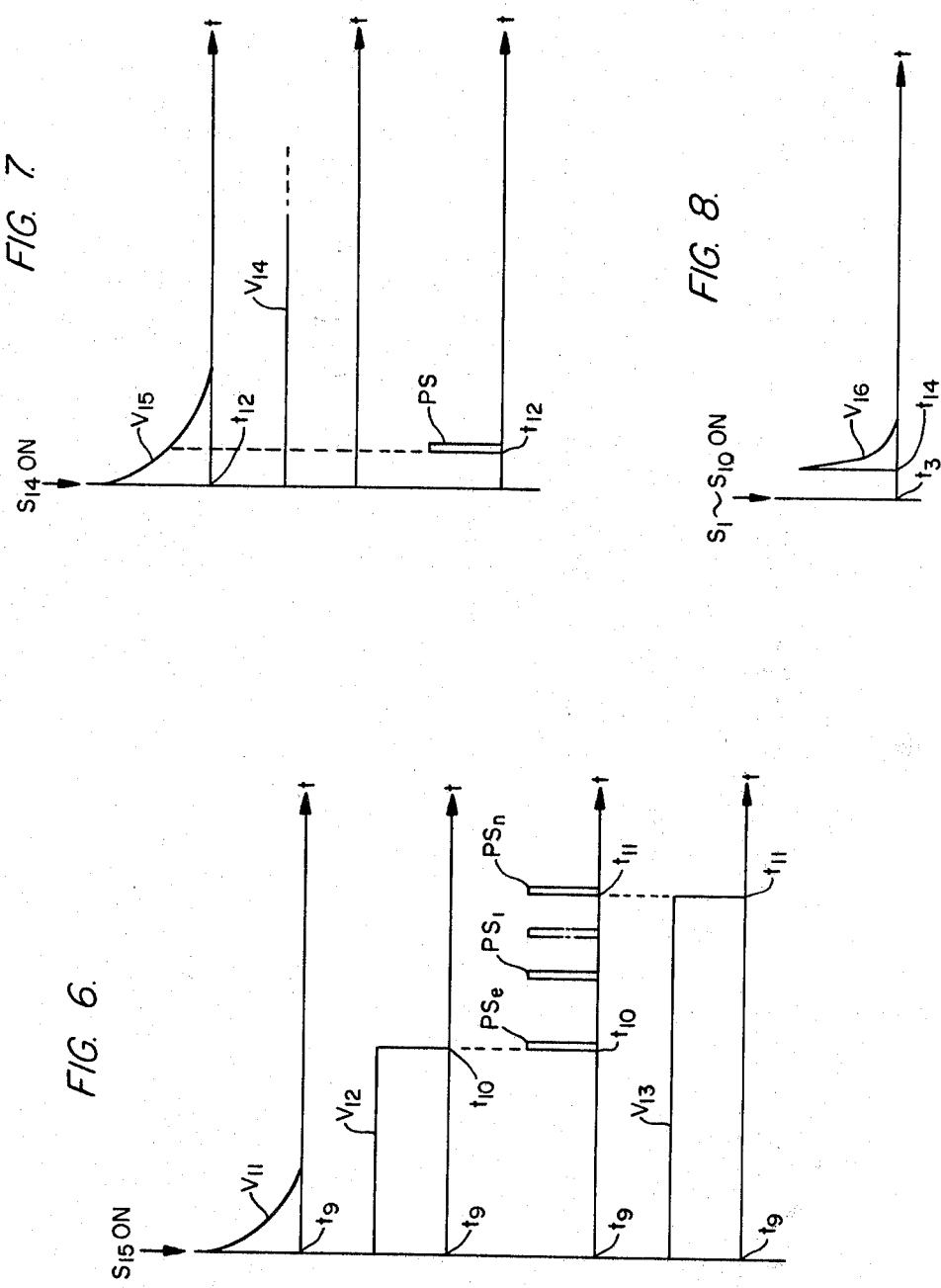

TAPE CONTROL SYSTEM FOR USE IN AN AUTOMATIC PROGRAM LOCATING SYSTEM FOR TAPE PLAYER

FIELD OF THE INVENTION

This invention relates to an automatic program locating system for a tape player for playing one or more desired programs selected in advance from plural programs recorded on the tape, and, more particularly, to an automatic program locating system for tapeplayers for skipping undesired or unselected programs at a fast speed and going on to one or more desired or selected programs in succession.

BACKGROUND OF THE INVENTION

Automatic program locating systems have been proposed. For example, U.S. Pat. No. 4,014,039 entitled AUTOMATIC PROGRAM LOCATOR FOR TAPE DECKS, issued on Mar. 22, 1977, illustrates systems of this type.

The automatic program locating system of the prior art is responsive to only one program. When it is desired to play more than one of the programs recorded on the tape, the operator must repeat the introduction of the command to play the following desired program. This results in a time-consuming and troublesome process.

SUMMARY OF THE INVENTION

Accordingly, an object of the present invention is to provide a novel automatic program locating system for tapeplayers able to respond to one or more desired programs selected from plural programs recorded on the tape.

Another object of the present invention is to provide an automatic program locating system for tapeplayers being able to skip correctly undesired programs and go on to desired programs in either direction.

A further object of the present invention is to provide an automatic program locating system for tapeplayers suitable for selecting desired programs by using index numbers associated with the individual programs.

A still further object of the present invention is to provide an automatic program locating system for tapeplayers that have a reduced incidence of malfunction.

To achieve the foregoing objects in accordance with the invention, as embodied and broadly described herein, in a recording tape reproduction apparatus wherein the tape includes recorded programs separated by unrecorded spaces, a tape control system for selecting and locating programs to be reproduced at a tape playback speed and for initiating a tape bypass speed faster than the tape playback speed for passing by non-selected programs at a high rate, the system comprising means for sensing the recorded programs and the unrecorded spaces on the tape and for generating space detection signals in response to the sensed unrecorded spaces, means coupled to the sensing and generating means and receiving the space detection signals for storing a sequence of designations associated with the recorded programs on the tape and for outputting the designations in succession in response to the space detection signals, each of the designations having a first value indicating a recorded program selected for reproduction or a second value indicating a recorded program to be bypassed, means for selectively presetting one or more of the designations to the first value to select the recorded programs to be reproduced, and means for receiving the successively outputted designations and for sensing when a received designation is equal to the first value to permit the selected program to be reproduced at the tape playback speed and when the received designation is equal to the second value to permit the apparatus to operate at the tape bypass speed.

Other and further objects features and advantages of the present invention will become apparent to persons skilled in the art from a study of the following description of the accompanying drawings, in which:

BRIEF DESCRIPTION OF THE DRAWINGS

FIG. 2 is a block diagram of an automatic program locating system according to the present invention;

FIGS. 4 to 8 are timing charts for explaining the different operations of FIG. 3;

FIG. 10 is a mechanism for locking a tape control member into a high speed tape driving condition in response to the second control circuit.

DESCRIPTION OF THE PREFERRED EMBODIMENT

Figure 1:
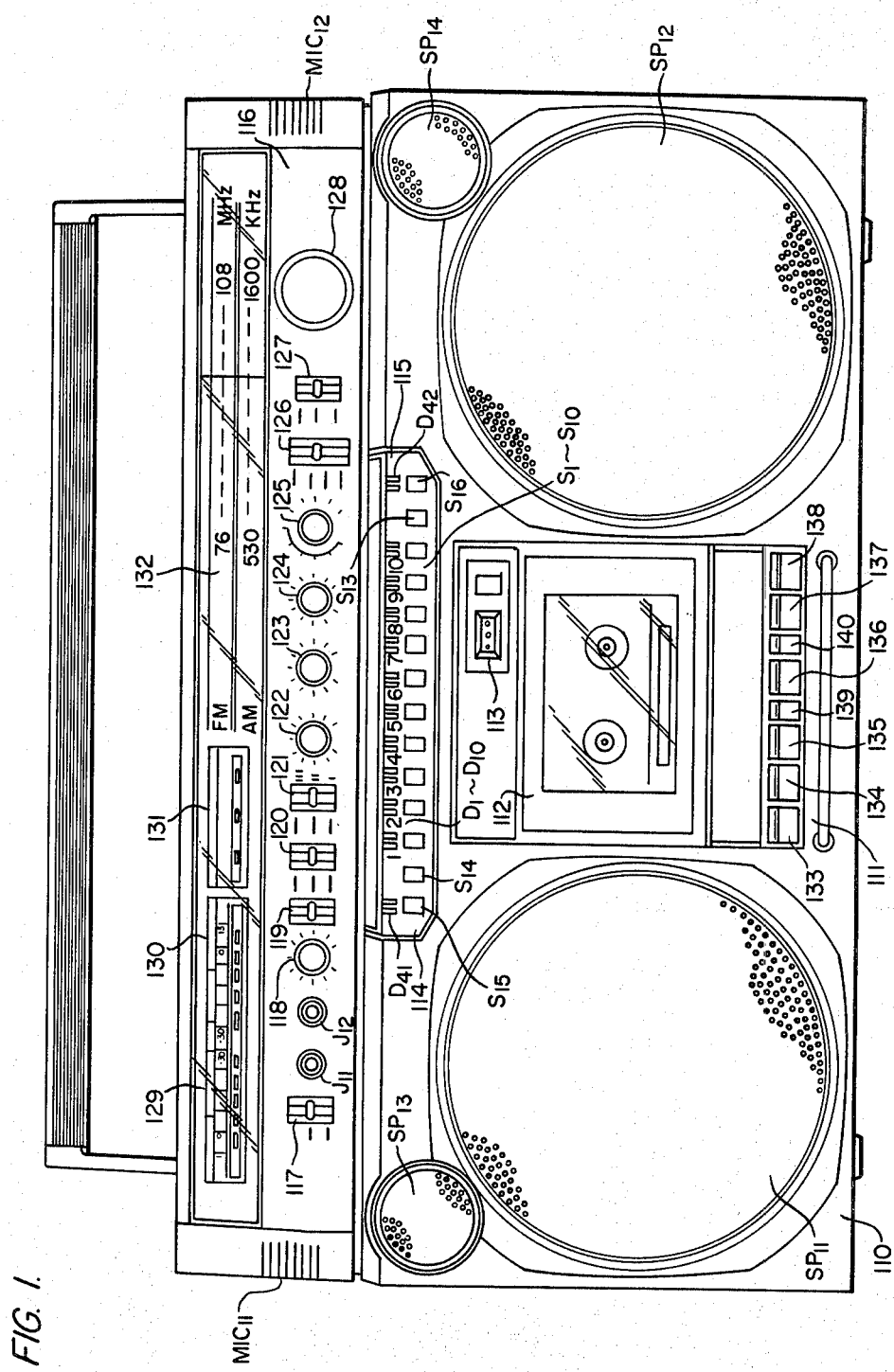
FIG. 1 is a front view of the tapeplayer adapted to an automatic program locating system according to the present invention.

The present invention will be described in detail with reference to the drawings FIG. 1 to FIG. 10. Throughout the drawings, like reference numerals will be used to designate like or equivalent portions, for the sake of simplicity of explanation.

FIG. 1 shows a front view of a stereophonic tapeplayer with a tuner section, adapted for an automatic program locating system according to the present invention. There are located a cassette tape-loading portion 112 and a tape counter 113 in the center of the tape player 110. A tape control section 111 for commanding the operations of the tape is located under the cassette tape-loading section 112. A preset section 114 and an indicator section 115 for automatic program location are located above the cassette tape-loading portion 112. On both sides of the cassette tape-loading portion, there are located a left channel speaker section including a lower range speaker $SP_{11}$ and a higher range speaker $SP_{13}$ and a right channel speaker section including a lower range speaker $SP_{12}$ and a higher range speaker $SP_{14}$.

Moreover, above the preset section 114 and the indicator section 115, there are located selecting switches in a control knobs section 116 including a power switch 117, an attenuator knob 118 for extension microphones, a tape recording characteristics selector knob 119, a stereophonic sound effects selector knob 120, a beating noise cutter knob 121, a bass control knob 122, a treble control knob 123, a channel balance control knob 124, a volume control knob 125, a function selector knob 126 for selecting among a tape mode, a radio receiving mode, and two other positions corresponding to additional audio signal sources, for example, a record disc player, a frequency band selector knob 127, and a tuning control knob 128.

Above the section 116, there are located a left channel volume indicator 129, a right channel volume indicator 130, a tuning meter 131, and a tuning dial 132. Left and right built-in microphones $MIC_{11}$ and $MIC_{12}$ are located on both sides adjacent to the section 116. Jacks $J_{11}$ and $J_{12}$ for headphone and an extension microphone are located between the power switch knob 117 and the attenuator knob 118 of the section 116.

The control section 111 has a stop key 133 for stopping all operations of the tape, a recording key 134 for selecting the recording operation, a rewind key 135 for rewinding the tape, a review key 139 for searching a desired program on the former part of the tape, a playback key 136 for playing back the tape, a cue key 140 for searching a desired program on the latter part of the tape, a fast forward key 137 for advancing forward the tape at a fast speed, and a pause key 138 for pausing the tape temporarily.

Preset section 114 has ten preset switch buttons $S_1$–$S_{10}$, an index shift switch button $S_{13}$, a reset switch button $S_{14}$, and a start switch button $S_{15}$, each button being described later in detail. Indicator section 115 has ten indicators, for example, light-emitting diodes, $D_1$–$D_{10}$, respectively, corresponding to preset switch buttons $S_1$–$S_{10}$, and an indicator $D_{41}$ for indicating a playback condition during the operation of the automatic program location. Editor switch button $S_{16}$ for editing a blank or unrecorded block on the tape during the recording operation, and an indicator $D_{42}$ for indicating the selection of the editing operation are located adjacent to preset section 114 and indicator section 115, respectively.

FIG. 2 shows the tape control system of the present invention in block diagram form. The system includes means for sensing recorded programs and unrecorded spaces and for generating space detection signals in response to the unrecorded spaces. As embodied herein, the sensing and generating means comprises a sensing head H slightly spaced from or in physical contact with a music tape T on which several programs are recorded when the tape player is in the automatic program location mode. The automatic program location mode is activated by actuation of the play key 136 and one of the review and cue keys 139 and 140 or the start switch button $S_{15}$ together. Start switch button $S_{15}$ makes cue key 140 operate automatically as will be described later.

The output signals of the sensing head H are introduced to an amplifier A and amplified to produce amplified signals having a predetermined amplitude. The amplified signals are applied to an unrecorded space detection circuit SD which outputs a pulse signal PS to presettable shift register 219 for every detection of a blank or recorded space between recorded programs.

Means are coupled to the sensing and generating means and receive the space detection signals for storing a sequence of designations associated with the recorded programs on the tape and for outputting the designations in succession in response to the space detection signals, each of the designations having either a first value indicating a recorded program selected for reproduction or a second value indicating a recorded program to be bypassed. As embodied herein, the storing and outputting means comprises a shift register means.

The shift register means, in turn, comprises a presettable shift register 219 has a plurality of bit-stages, for example, ten bit stages $FF_{10}$ to $FF_1$ designated to the numerals 10 to 1, respectively. The initial contents of presettable shift register 219 can be preset by means for selectively presetting one or more of the designations to the first value to select the recorded programs to be reproduced. As embodied herein, the presetting means comprises preset switches $S_{10}$ to $S_1$, included in the preset section 113 and respectively corresponding to bit-stages $FF_{10}$ to $FF_1$. The individual contents of the bit-stages $FF_{10}$ to $FF_2$ are shifted to respective next bit-stages $FF_9$ to $FF_1$ upon every occurrence of the pulse signal PS, while the content of last bit-stage FF is outputted as the output of presettable shift register 219 upon every occurrence of the pulse signal PS. The preset contents of the bit-stages $FF_9$, $FF_5$ and $FF_2$, for example, are shifted to respective next bit-stages $FF_8$, $FF_4$ and $FF_1$ upon the occurrence of a first pulse signal $PS_1$. Subsequently, the contents of bit-stages $FF_8$ and $FF_4$ are shifted to respective next bit-stages $FF_7$ and $FF_3$ upon the occurrence of a second pulse signal $PS_2$. The content of last bit-stage $FF_1$ is outputted upon the occurrence of the second pulse signal $PS_2$.

The output signal of presettable shift register 219 is applied to a means for receiving the successively outputted designations and for sensing when a said received designation is equal to the first value to permit the selected program to be reproduced at the tape playback speed and when a received designation is equal to the second value to permit the apparatus to operate at the tape bypass speed.

As embodied herein, the receiving and sensing means comprises an output content detection circuit CD having two opposite phase outputs $Z_1$ and $Z_2$. Outputs $Z_1$ and $Z_2$ are activated or deactivated in response to the contents of output-content detection circuit CD. Outputs $Z_1$ and $Z_2$ are respectively connected to tape speed shifting circuits 220 and 221. First tape speed shifting circuit 220 is connected to output $Z_1$ of output-content detection circuit 219 and operates to shift the tape speed to normal playback condition when the output $Z_1$ is activated. On the other hand, second tape speed shifting circuit 221 is connected to output $Z_2$ of the output-content detection circuit 219, and operates to shift the tape speed into a fast or high-speed condition when output $Z_2$ is activated.

The operation of the automatic program locating system will be described below. The automatic program location mode is introduced by presetting one or more bit-stages of presettable shift register 219, and then operating playback key 136 and either the cue key 140 or the review key 139 together. The initial contents of all of the bit-stages $FF_{10}$ to $FF_1$ in presettable shift register 219 and the output-content detection circuit CD are RESET states. If bit-stages $FF_9$, $FF_5$ and $FF_2$ are preset, only the contents of these bit-stages are changed into the SET state, while the contents of remaining bit-stages, $FF_{10}$, $FF_8$, $FF_7$, $FF_6$, $FF_4$, $FF_3$ and $FF_1$, and the output-content detection circuit CD remain in the RESET state. Tape T is driven at a fast speed and sensing head H is positioned into physical contact with the tape T, when playback key 136 and one of the review keys 139 or the cue key 140 are operated.

The recorded signal on tape T is picked up by sensing head H and introduced to amplifier A where it is amplified to predetermined level. The amplified signal is introduced to the unrecorded space detection circuit SD. Unrecorded space detection circuit SD generates on pulse signal when the amplitude of the amplified signal falls below a predetermined level. That is, unrecorded space detection circuit SD generates a pulse signal PS when any unrecorded or blank space between recorded programs reaches the sensing head H. The pulse signal PS is introduced to presettable shift register 219 and as a result, the contents of all of the individual bit-stages $FF_{10}$ to $FF_1$ are shifted to the next respective bit-stages, and the content of last bit-stage $FF_1$ is shifted to output-content detection circuit CD. The content of the first bit-stage $FF_{10}$ becomes a RESET state upon receiving the pulse signal PS whether its initial content was the SET state or the RESET state.

Therefore, the contents of bit-stages $FF_8$, $FF_4$, and $FF_1$ change to SET states upon receiving the pulse signal PS because the contents of the preceding bit-stages $FF_9$, $FF_5$ and $FF_2$ were the SET state. The contents of bit-stages $FF_9$, $FF_5$, and $FF_2$ change to the RESET states upon receiving the pulse signal PS for a similar reason. The contents of the remaining bit-stages, however, remain in the RESET state.

The content, that is the RESET state, of the last bit-stage $FF_1$ is outputted to the output-content detection circuit CD upon receiving the pulse signal PS. In other words, the RESET state of the last bit-stage $FF_1$ is shifted to output-content detection circuit CD. Accordingly, the content of output-content detection circuit CD remains in the RESET state so that the conditions of the two outputs $Z_1$ and $Z_2$ do not change. As a result, tape T is continuously driven at a fast speed, and the operation is continued for the next program.

The second pulse signal $PS_2$ is generated by the unrecorded space detection circuit SD in the same manner when the second unrecorded space reaches the sensing head H. The second pulse signal $PS_2$ is introduced to presettable shift register 219 with the result that the contents of individual bit-stages $FF_{10}$ to $FF_1$ are, again, shifted into respective next bit-stages $FF_9$ to $FF_1$ and the output-content detection circuit CD. That is, the contents of bit-stages $FF_7$ and $FF_3$ and the content of output-content detection circuit CD change to the SET state, while the contents of bit-stages $FF_8$, $FF_6$ and $FF_1$ change to the RESET state. The contents of the remaining bit-stages $FF_{10}$, $FF_9$, $FF_6$, $FF_5$, and $FF_2$ remain in the RESET state.

The SET state of the output-content detection circuit CD causes the conditions of outputs $Z_1$ and $Z_2$ to change so that first tape speed shifting circuit 220 is activated to shift the tape speed into the normal playback condition. As a result, the second program designated by the presetting of bit-stage $FF_2$ is played back.

When the third unrecorded space between second and third programs reaches sensing head H, a third pulse signal $PS_3$ is introduced to presettable shift register 219 and causes the contents of individual bit-stages $FF_{10}$ to $FF_1$ to be further shifted to respective next bit-stages $FF_9$ to $FF_1$ and output content detection circuit CD. That is, the contents of bit-stages $FF_7$ and $FF_3$ and the content of output-content detection circuit CD change to the RESET state. The contents of the remaining bit-stages $FF_{10}$ to $FF_8$, $FF_5$, $FF_4$ and $FF_1$ remain in the RESET state.

The transition of output-content detection circuit CD to the RESET state causes the conditions of outputs $Z_1$ and $Z_2$ to change so that second tape speed shifting circuit 221 is activated to shift the tape speed into fast speed condition. As a result, the cue operation is started again for the third program.

In the same manner, tape playbacks are initiated when the 5th and 9th pulse signals $PS_5$ and $PS_9$ are introduced to presettable shift register 219. As a result, the 5th and 9th programs designated by the presetting of the bit-stages $FF_5$ and $FF_9$ are played-back.

As described above, the automatic program location is accomplished for several programs, for example, the 2nd, 5th and 9th programs designated by presetting bit-stages $FF_2$, $FF_5$, and $FF_9$ of presettable shift-register 219.

Figure 3A:
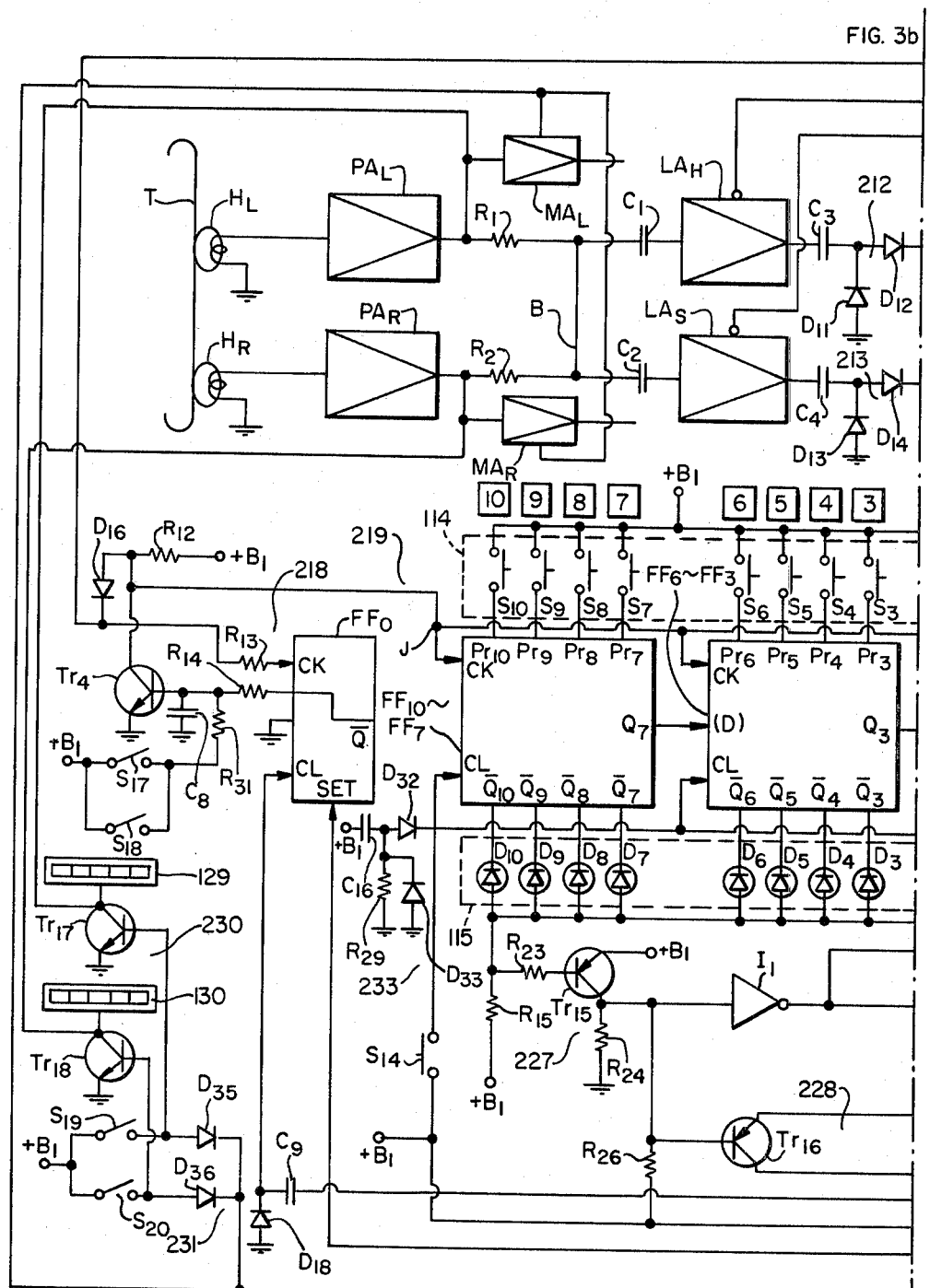
FIG. 3 is a schematic circuit diagram of an automatic program locating system according to the present invention.
Figure 3B:
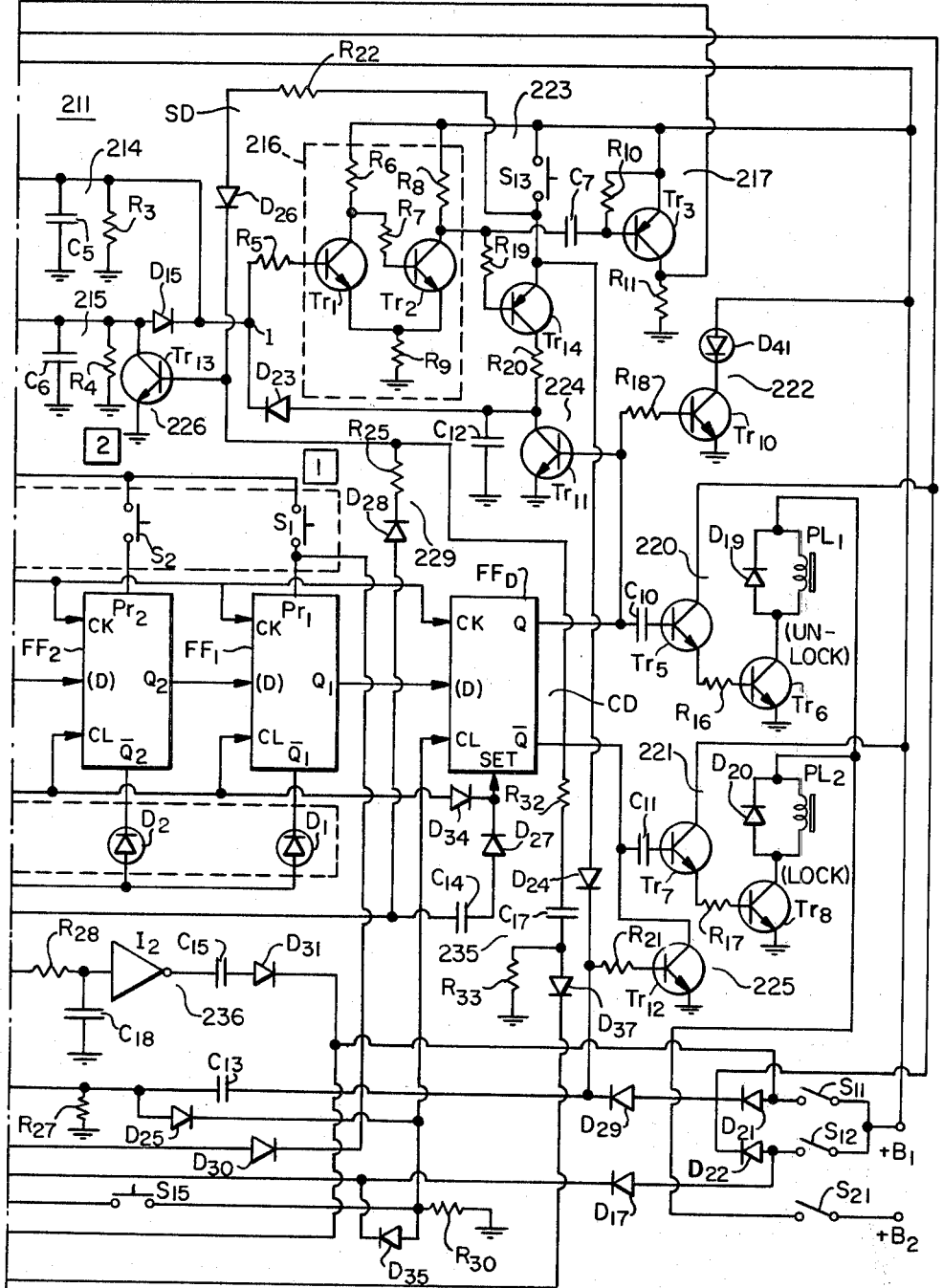

FIG. 3 shows a detailed circuit diagram of the automatic program locating system which is basically similar to FIG. 2, but includes several additional functions. Left and right channel sensing heads $H_L$ and $H_R$ are positioned adjacent to or in physical contact with the tape T when the tape player is in the automatic program locating operation mode. In FIG. 3, sensing heads $H_L$ and $H_R$ are illustrated as being separated from each other in the direction of the tape length for convenience of drawing. But they are actually located so that they overlap each other in the direction of tape width. The signals sensed by the sensing heads $H_L$ and $H_R$ are introduced into the amplifier section A. First, the signals are amplified by pre-amplifiers $A_L$ and $A_R$, respectively. The pre-amplified signals are combined at a connecting node B of buffer resistors $R_1$ and $R_2$ connected in series between the output terminals of the pre-amplifiers $A_L$ and $A_R$. The combined signal is introduced to first and second limiting amplifiers $LA_H$ and $LA_S$ sensitive to a higher frequency range and a lower frequency range, respectively, through coupling capacitors $C_1$ and $C_2$.

The amplifier $LA_H$ is coupled to a power source $+B_1$ through switch $S_{11}$ interlocked to cue key 140 (FIG. 1) or switch $S_{12}$ interlocked to review key 139 (FIG. 1) and has a frequency characteristic suitable for signal processing during the cue or review operations at fast tape speed. On the other hand, second limiting amplifier $LA_S$ is always directly coupled to power source $+B_1$, but the output signal from the second limiting amplifier $LA_S$ may be stopped during cue or review operation will be described later. The second limiting amplifier $LA_S$ has a frequency characteristic suitable for signals sensed during the playback operation at normal tape speed. Therefore, the pre-amplified signal during the cue or review operation is amplified to a predetermined level by first limiting amplifier $LA_H$, while the pre-amplified signal during the playback operation is amplified to a predetermined level by second limiting amplifier $LA_S$. The amplified signals from the first to the second limiting amplifier $LA_H$ or $LA_S$ are introduced into respective rectifiers 212 or 213 constructed by diodes $D_{11}$ and $D_{12}$ or $D_{13}$ through coupling capacitor $C_3$ or $C_4$, resulting in each amplified signal being changed into a DC signal.

Each DC signal is given a respective predetermined time constant by respective time constant circuits 214 or 215 connected to respective rectifiers 212 or 213. The time constants of circuit 214 and 215 are selected to be several hundred milliseconds and several seconds, respectively. Each DC signal with its associated time constant is introduced to unrecorded space detection circuit SD through its input terminal I. A buffer diode $D_{15}$ is connected in the forward direction between the rectifier 213 of the second channel and the input terminal I.

At the inside of the unrecorded space detection circuit SD, the DC signal is applied to the input terminal of a conventional Schmitt circuit 218 through a resistor $R_S$. The Schmitt circuit 216 is constructed by transistors $Tr_1$ and $Tr_2$, with their emitters being grounded through a common emitter resistor $R_9$. The collector of transistor $Tr_1$, whose base is connected to the input terminal of Schmitt circuit 216, is connected to the base of transistor $Tr_2$ and the collector of $Tr_2$ is connected to an output terminal of the Schmitt circuit 216. The output level of the output terminal of the Schmitt circuit 216 is high whenever the recorded signal on the tape is being picked up by the sensing heads $H_L$ and $H_R$. The output level drops suddenly when an unrecorded or blank space reaches the sensing heads $H_L$ and $H_R$. The lowered output voltage is differentiated by capacitor $C_7$ and resistor $R_{10}$, and applied to PNP transistor $Tr_3$. Transistor $Tr_3$ is connected at its emitter to power source $+B_1$ and at its collector to ground through resistor $R_{11}$. As a result, a positive pulse signal PS is outputted from the collector of transistor $Tr_3$ as a detection signal for an unrecorded or blank space.

The pulse signal PS is applied to presettable shift register 219 having plural bit stages, for example, ten bit-stages, formed by delay-type flip-flops (D-FF) $FF_{10}$ to $FF_1$. Respective D-FF's $FF_{10}$ to $FF_1$ have preset terminals $Pr_{10}$ to $Pr_1$ connected to power source $+B_1$ through preset switches $S_{10}$ to $S_1$, clock terminals CK connected to input terminal J terminals $Q_{10}$ to $Q_1$ connected to power source $+B_1$ through indicators, for example, light emitting diodes $D_{10}$ to $D_1$, and clear terminals CL connected to power source $+B_1$ through common reset switch $S_{14}$. Contents of respective D-FF's, $FF_{10}$ to $FF_1$ can be set by means of supplying power source $+B_1$ to respective preset terminals $Pr_{10}$ to $Pr_1$ through preset switches $S_{10}$ to $S_1$ resulting in respective positive phase sequence output terminals $Q_{10}$ to $Q_1$ having high levels and respective output terminals $\bar{Q}_{10}$ to $\bar{Q}_1$ having low levels. On the other hand, the contents of all D-FF's $FF_{10}$ to $FF_1$ are wholly reset by means of supplying power source $+B_1$ to all clear terminals $CL_{10}$ to $CL_1$ through common reset switch $S_{14}$.

The respective output terminals $Q_{10}$ to $Q_2$ of each of the D-FFs, $FF_{10}$ to $FF_2$, are connected to the input terminals D of the next successive D-FFs, $FF_9$ to $FF_1$. Therefore, pulse signal PS applied to respective clock terminals $CK_{10}$ to $CK_1$ through input terminal J of presettable shift register 219, causes the respective contents of D-FFs, $FF_{10}$ to $FF_2$ to be shifted to the next D-FFs, $FF_9$ to $FF_1$. At such time, the content of first stage D-FF, $FF_{10}$, is reset upon receiving pulse signal PS, and the content of the last stage D-FF, $FF_1$, is shifted to the output content detection circuit CD as will be described later in more detail. That is, the content of the last stage D-FF, $FF_1$ is shifted as an output signal of the presettable shift register 219 to the output-content detection circuit CD from the output terminal $Q_1$ of D-FF, $FF_1$.

The output content detection circuit CD is also constructed by a D-FF, $FF_D$ which has an input terminal D connected to the output terminal $Q_1$ of the last stage D-FF, $FF_1$ of the presettable shift register 219, and a clock terminal CK connected to the unrecorded space detection circuit CD for receiving the pulse signal PS. Accordingly, the content of the last-stage D-FF, $FF_1$ of presettable shift register 219 is shifted to the D-FF, $FF_D$ of the output-content detection circuit CD when the pulse signal PS is applied to the clock terminal CK of the D-FF, $FF_D$. The positive phase sequence output terminal Q is connected to the first tape speed shifting circuit 220. On the other hand, the negative phase sequence output terminal $\bar{Q}$ is connected to the second tape speed shifting circuit 221.

The first tape speed shifting circuit 220 is constructed by capacitor $C_{10}$, transistors $Tr_5$ and $Tr_6$, plunger $PL_1$, and diode $D_{19}$. Capacitor $C_{10}$ is connected between the output terminal Q of the D-FF, $FF_1$ and the base of transistor $Tt_5$. Transistor $Tr_5$ is connected at its collector to power source $+B_1$ and at its emitter to the base of transistor $Tr_6$ through resistor $R_{16}$. Transistor $Tr_6$ is connected at its collector to power source $+B_2$ through plunger coil $PL_1$, and at its emitter to ground. Diode $D_{19}$ is connected in reverse direction between the collector of transistor $Tr_6$ and power source $+B_2$ in parallel with plunger coil $PL_1$. Accordingly, when the output level of the output terminal Q of D-FF, $FF_D$ has changed to a high level, a pulse passing through capacitor $C_{10}$ is applied to the base of transistor $Tr_5$ resulting in transistors $Tr_5$ and $Tr_6$ becoming conductive. Plunger coil $PL_1$ is also activated for the time so that a plunger rod (not shown) connected to the plunger coil $PL_1$ shifts the tape speed to the normal playback speed by means of releasing a lock on the cue key 140 or the review key 139 (shown in FIG. 1).

The second tape speed shifting circuit 221 is constructed by capacitor $C_{11}$, transistors $Tr_7$ and $Tr_8$. A plunger coil $PL_2$ and a diode $D_{20}$ are connected in a manner similar to the first tape speed shifting circuit 220. That is, capacitor $C_{11}$ is connected between the output terminal $\bar{Q}$ of D-FF, $FF_D$ and the base of transistor $Tr_7$. Transistor $Tr_7$ is connected at its collector to power source $+B_1$ and at its emitter to the base of transistor $Tr_8$ through resistor $R_{17}$. Transistor $Tr_8$ is connected at its collector to power source $+B_2$ through plunger coil $PL_2$, and at its emitter to ground. Diode $D_{20}$ is connected in reverse direction between the collector of transistor $Tr_8$ and power source $+B_2$ in parallel with plunger coil $PL_2$. Accordingly, when the output level of output terminal $\bar{Q}$ of D-FF, $FF_D$, has changed into high level, a pulse passing through capacitor $C_{11}$ is applied to the base of transistor $Tr_7$ resulting in transistors $Tr_7$ and $Tr_8$ becoming conductive. Plunger coil $PL_2$ is also activated for a time so that a plunger rod (not shown) connected to the plunger coil $PL_2$ shifts the tape speed to fast speed by means of locking one key 140 (shown in FIG. 1) or review key 130 (shown in FIG. 1) into an operating position.

Therefore, when the SET state of the last stage D-FF, $FF_1$ has been shifted to D-FF, $FF_D$, the first tape speed shifting circuit 220 is activated resulting in the tape speed being shifted into normal playback speed. On the other hand, when the RESET state of the last stage D-FF, $FF_1$ has been shifted to D-FF, $FF_D$, the second tape speed shifting circuit is activated, resulting in the tape speed being shifted into the fast speed for cue or review operation. These operations are repeated in response to contents of respective D-FFs of the presettable shift register 219 being shifted to D-FF, $FF_D$ of the output content detection circuit CD every time pulse signals are generated by the unrecorded space detection circuit SD. After ten pulse signals PS have been treated, the contents of all of the presettable shift register 219 are RESET and the content of D-FF, $FF_D$ of the output-content detection circuit CD is maintained in the RESET state.

The D-FF, $FF_D$, of the output-content detection circuit CD has a SET terminal connected to the power source $+B_1$ and the content of the D-FF, $FF_D$ becomes the SET state in contrast with each stage D-FF, $FF_{10}$ to $FF_1$ of the presettable shift register 219, when the reset switch $S_{14}$ has been closed. Accordingly, the first speed shifting circuit 220 is activated to result in the tape speed becoming the normal playback speed. The tape speed is kept at the normal playback speed under the condition that the automatic program locating operation is deactivated by the operation of reset switch $S_{14}$. Hereupon, diode $D_{34}$ is connected in the forward direction between the connecting node of the clear terminals CL of the D-FFs $FF_{10}$ to $FF_1$ of presettable shift register 219 and the SET terminal of the D-FF $FF_D$ of the output-content detection circuit CD for isolating the clear terminals CL of the D-FFs $FF_{10}$ to $FF_1$ from the influence of the SET terminal of D-FF, $FF_D$.

Further, the D-FF $FF_D$ has a clear terminal CL connected to power source $+B_1$ through the start switch $S_{15}$ for starting automatically the automatic program locating operation after the presetting of the desired stage D-FFs of presettable shift register 219. The content of D-FF $FF_D$ becomes the RESET state when start switch $S_{15}$ has been operated, instead of the manual operation of the cue key 140 or the review key 139. As a result, the second tape speed shifting circuit 221 is activated so that cue key 140 or review key 139 is automatically locked into the operating position. Therefore, the automatic program locating operation is started either by manually operating the cue key 140 or the review key 139 and the operating start switch $S_{15}$.

The clear terminals CL of all of the stage D-FFs, $FF_{10}$ to $FF_1$ of the presettable shift register 219 are further connected to power source $+B1$ through capacitor $C_{16}$. Accordingly, the contents of all D-FFs $FF_{10}$ to $FF_1$ are cleared into the RESET state by a pulse passing through capacitor $C_{16}$, when the power source $+B_1$ has been activated in cooperation with setting the function selecting switch 126 (shown in FIG. 1) into the tape mode. Resistor $R_{29}$ is connected between capacitor $C_{16}$ and ground to provide a predetermined time constant to a pulse passing through capacitor $C_{16}$. A diode $D_{32}$ is connected between the capacitor $C_{16}$ and the connecting node of the clear terminals CL of all the D-FFs $FF_{10}$ to $FF_1$ in the forward direction for isolating the reset switch $S_{14}$ from the influence of the resistor $R_{29}$.

Further, the automatic program locating system shown in FIG. 3 has a circuit for removing a first pulse signal $PS_1$ upon initiation of the review operation. The first pulse signal removing circuit is necessary in order to operate the automatic program locating system in the reverse direction, because of the occurrence of unrecorded space located at the front of the desired program. Therefore, the first pulse signal must be removed.

The first pulse signal removing circuit 218 is connected between the unrecorded space detection circuit SD and presettable shift register 219. The first pulse signal removing circuit 218 includes a diode $D_{16}$, a transistor $Tr_4$ and flip-flop $FF_0$. The diode $D_{16}$ is further connected to the input terminal J of presettable shift register 219. Transistor $Tr_4$ is connected at its collector to diode $D_{16}$ and at its emitter to ground. The base of transistor $Tr_4$ is connected to negative phase sequence output terminal Q of flip-flop $FF_0$ through resistor $R_{14}$. The flip-flop $FF_0$ is connected at its clock terminal CK to the unrecorded space detection circuit SD and at its clear terminal CL to the power source $+B_1$ through capacitor $C_9$ and switch $S_{12}$ which is closed in connection with the operation of the review key 139, shown in FIG. 1. Further, the SET terminal of the flip-flop $FF_0$ is connected to the power source $+B_1$ through switch $S_{11}$ which is closed in connection with the operation of the cue key 140 (shown in FIG. 1).

When the review key 139 has been operated to start the automatic program locating operation in the reverse direction, the switch $S_{12}$ is closed so that a pulse passing through the capacitor $C_9$ is applied to the clear terminal CL of the flip-flop $FF_0$. Therefore, the output level of output terminal $\overline{Q}$ of flip-flop $FF_0$ becomes high, resulting in transistor $T_{r4}$ becoming activated. As a result, diode $D_{16}$ is biased in the reverse direction because the ground potential is introduced to the anode of diode $D_{16}$. Under the above condition, the first pulse signal $PS_1$ from the unrecorded space detection circuit SD is prevented from being applied to the presettable shift register 219 by the reverse biased diode $D_{16}$. The first pulse signal is, however, applied to the clock terminal CK of the flip-flop $FF_0$, resulting in the content of the flip-flop $FF_0$ being inverted. Therefore, the output level of the output $\overline{Q}$ of the flip-flop $FF_0$ becomes a low level and the transistor $Tr_4$ is deactivated, resulting in the diode $D_{16}$ being biased in the forward direction. As a result, pulse signals on and after the second are applied to the presettable shift register 219 through the forward biased diode $D_{16}$.

When the cue key 140 has been operated for starting the automatic program locating operation in the forward direction, switch $S_{11}$ is closed in response to the operation of the cue key 140 so that the power source voltage $+B_1$ is applied to the SET terminal of the flip-flop $FF_0$. Therefore, the output level of the output terminal $\overline{Q}$ becomes low level, resulting in the deactivation of the transistor $T_{r4}$. As a result, the diode $D_{16}$ is biased in the forward direction and all pulse signals including the first pulse signal are applied to the presettable shift register 219 without being prevented by the first pulse signal removing circuit 218.

The first pulse signal removing circuit 218 is also operative to prevent malfunctions, as described in below, by means of the connection of the base of the transistor $Tr_4$ and the power source $+B_1$ through switches $S_{17}$ and $S_{18}$ each in parallel with the other. Switch $S_{17}$ is operated in connection with the pause key 138 (shown in FIG. 1) for pausing the playback operation. When the pause key 138 is operated, the signals picked up by sensing heads $H_L$ and $H_R$ disappear, resulting in an error pulse signal being generated which is not in fact based on unrecorded space detection by the unrecorded space detection circuit SD. The error pulse signal is, however, removed by the first pulse signal removing circuit 218 as described above. On the other hand, switch $S_{18}$ is in connection with a mechanism (not shown) for locking the cue key 140 or the review key 139 into operating position in response to the operation of plunger $PL_2$. During the operation of the mechanism, the sensing heads $H_L$ and $H_R$ are decoupled from the tape T for a time resulting in the sensed signal to disappear and an error pulse signal to be generated by the unrecorded space detection circuit SD which is being not based on an actual unrecorded space. The error pulse signal is, however, removed by the first pulse signal removing circuit 218 in the manner described above.

Clear terminal CL of flip-flop $FF_0$ is further connected to the start switch $S_{15}$ through the buffer diode $D_{35}$ connected in a forward direction between the start switch $S_{15}$ and the capacitor $C_9$ to isolate the clear terminal CL of the flip-flop $FF_0$ from the influence of the switch $S_{12}$ interlocked with the review key 139. For the same reason, the diode $D_{17}$ is connected in a forward direction between the switch $S_{12}$ and the connecting node of the diode $D_{35}$ and the capacitor $C_9$. An undesired or error pulse signal not based upon actual unrecorded space is generated by the unrecorded space detection circuit whenever the start switch is closed to initiate an automatic program locating operation. No signal is picked up by the sensing heads $H_L$ and $H_R$ before the cue or review operation has been entirely set and the error pulse signal is removed by the first pulse signal removing circuit 218 in the manner described above.

The automatic program locating system shown in FIG. 3 has a further circuit for generating oscillating pulses that are distinct from signal PS based on unrecorded space. This sort of pulse oscillating circuit is necessary whenever the presetting is practiced by designating the index numbers of desired programs. The pulse oscillating circuit is connected to supply the oscillated pulses into the presettable shift register 219. In the embodiment shown in FIG. 3, the pulse oscillating circuit is constructed by using the Schmitt circuit 216 described above in cooperation with a positive feedback circuit 223. The positive feedback circuit 223 includes a transistor $Tr_{14}$, a diode $D_{23}$, and a switch $S_{13}$. The PNP transistor $Tr_{14}$ is connected at its base to the output terminal of the Schmitt circuit 216 through a resistor $R_{19}$ and at its emitter to the power source $+B_1$ through the switch $S_{13}$. The collector of the transistor $Tr_{14}$ is connected to the input terminal I of the unrecorded space detection circuit SD through a resistor $R_{20}$ and a diode $D_{23}$ coupled in the forward direction. Further, a transistor $Tr_{11}$ is connected between the connecting node of the resistor $R_{20}$, the diode $D_{23}$, and ground. The base of the transistor $Tr_{11}$ is connected to the output terminal Q of the D-FF $FF_D$ of the output-content detection circuit CD.

The operation of the pulse oscillating circuit will be described below. If two desired programs have the index numbers 5 and 9, respectively, and the program sensing heads $H_L$ and $H_R$ are located adjacent the portion of tape corresponding to the index number 2, the D-FFs $FF_5$, and $FF_2$ of presettable register 219 and the closing switch $S_{13}$ must be preset. To this end, the pulse oscillating circuit generates pulses until the number of pulses needed for shifting the SET state of the D-FF, $FF_2$, of the presettable shift register 219 into the D-FF, $FF_D$, of the output content detection circuit CD. The oscillating cycle of the pulses is a function of the capacitor $C_5$, the resistor $R_3$ of the time constant circuit 214, the resistor $R_5$, the diode $D_{23}$, the resistor $R_{20}$, and the capacitor $C_{12}$ connected between the connecting node of the resistor $R_{20}$, and the diode $D_{23}$, and ground.

The positive feedback circuit 223 is activated by closing the switch $S_{13}$ resulting in the feedback of the output signal of the Schmitt circuit 216 to its own input terminal in the same phase. Pulse signals not based on unrecorded space are generated by the pulse oscillating circuit. These pulse signals are supplied to the presettable shift register 219 resulting in the contents of the respective bit-stage D-FFs $FF_{10}$ to $FF_1$ being shifted into the next D-FFs $FF_9$ to $FF_1$ of the presettable shift register 219 and the D-FF $FF_D$ of the output-content detection circuit CD. When the SET state of the D-FF $FF_2$, which has been set by pressing the preset switch $S_2$, has been shifted by the second oscillating pulse, the content of the D-FF $FF_D$ will change to the SET state. Therefore, a high level (H) of the output Q is applied to the base of transistor $Tr_{11}$ to bias transistor $Tr_{11}$ into the ON condition. As a result, the generating of pulse signals stops because the connecting node of the resistor $R_{20}$ and the diode $D_{23}$ is grounded. At the time, the SET states of the D-FFs $FF_9$ and $FF_5$, which had been SET by pressing the preset switches $S_9$ and $S_5$ has been shifted into D-FFs $FF_7$ and $FF_3$. Accordingly, the locations of the 7th and 3rd programs behind the present program, or programs having the index numbers 9 and 5 are preset.

Activation of the second tape speed shifting circuit 221 is prohibited during the generation of the pulses for preventing malfunction. A transistor $Tr_{12}$ is connected between the Q output terminal of the D-FF $FF_D$ of the output-content detection circuit CD and ground. The base of the transistor $Tr_{12}$ is connected to the emitter of $Tr_{14}$ through a diode $D_{24}$ in the forward direction and a resistor $R_{21}$. Transistor $Tr_{12}$ is biased in the ON condition by the closing of the switch $S_{13}$ resulting in the deactivation of the second tape speed shifting circuit 221. Further, the connection node of the diode $D_{24}$ and the resistor $R_{21}$ is connected to the clear terminal CL of D-FF $FF_D$ of the output-content detection circuit CD through a capacitor $C_{13}$ and a diode $D_{25}$ in forward direction. Accordingly, the content of D-FF $FF_D$ is kept in the RESET state, or the $\bar{Q}$ output terminal of the D-FF $FF_D$ is kept in L level during the closing switch $S_{13}$ resulting in the deactivation of the second tape speed shifting circuit 221.

The automatic program locating system shown in FIG. 3 includes additional indicators comprising light-emitting diodes $D_{10}$ to $D_1$ connected between the $\bar{Q}$ output terminals of respective D-FFs $FF_{10}$ to $FF_1$ of the presettable shift register 219 and the power source $+B_1$ through a common resistor $R_{15}$. The light-emitting diodes $D_{10}$ to $D_1$ are activated to emit light when the contents of the D-FFs $FF_{10}$ to $FF_1$ are in the SET state. Further, the Q output terminal of the D-FF $FF_D$ of the output-content detection circuit CD is connected to the base of the transistor $Tr_{10}$ which is connected at its emitter to ground and at its collector to the power source $+B_1$ through a light-emitting diode $D_{41}$ through resistor $R_{18}$ for indicating normal playback condition. The light-emitting diode $D_{41}$ is activated to emit light when the content of the D-FF $FF_D$ is in the SET state, because transistor $Tr_{10}$ is biased in the ON condition by a high level at the Q output terminal of the D-FF $FF_D$.

The automatic program locating system shown in FIG. 3 includes an additional circuit 227 for setting the content of the D-FF $FF_D$ of the output-content detection circuit CD to the SET state whenever the contents of all of the D-FFs $FF_{10}$ to $FF_1$ are in the RESET state, or all of the preset switches $S_{10}$ to $S_1$ are not operated. The circuit includes a PNP transistor $Tr_{15}$ and an inverter $I_1$. The connecting node of all of the light-emitting diodes $D_{10}$ to $D_1$ is connected to the base of the transistor $Tt_{15}$ through a resistor $R_{23}$. Transistor $Tr_{15}$ is connected at its emitter to the power source $+B_1$ and at its collector to ground through a resistor $R_{24}$ and to the power source $+B_1$ through the resistor $R_{26}$. Transistor $Tr_{15}$ is biased in the OFF condition when the contents of all of the D-FFs $FF_{10}$ to $FF_1$ of the preset-table shift register 219 are RESET because all of the $\bar{Q}$ outputs are high levels so that the level of the connecting node of all of the diodes $D_{10}$ to $D_1$ is also a high level. Therefore, the collector level is the power source $+B_1$ divided by the resistors $R_{24}$ and $R_{26}$. The collector of the transistor $Tr_{15}$ is connected to the SET terminal of the D-FF $FF_D$ of the output-content detection circuit CD through an inverter $I_1$, a capacitor $C_{14}$ and a diode $D_{27}$ connected in series. Accordingly, a pulse passing through the capacitor $C_{14}$ is applied to the SET terminal of the D-FF $FF_0$ when transistor $Tr_{15}$ is switched into the ON condition by the output level of inverter I changing into the high level. As a result, the content of the D-FF $FF_D$ is forced to the SET state resulting in the first tape speed shifting circuit 220 being activated for normal playback operation and the D-FF $FF_D$ being RESET.

Further, a circuit 228 for forcing the content of the D-FF $FF_1$ of the presettable shift register 219 to the SET state is connected to circuit 227. Circuit 228 includes a PNP transistor $Tr_{16}$. The base of transistor $Tr_{16}$ is connected to the collector of transistor $Tr_{15}$ of circuit 227. Transistor $Tr_{16}$ is connected at its emitter to ground through the resistor $R_{27}$ and to the preset terminal $Pr_1$ of the D-FF $FF_1$ through diode $D_{30}$ in the forward direction. The emitter of transistor $Tr_{16}$ is further connected to the power source $+B_1$ through a capacitor $C_{13}$, a diode $D_{29}$ in the forward direction, and a circuit including the switch $S_{11}$ interlocked to the cue key 140 and the switch $S_{12}$ interlocked to the review key 139. The switches $S_{11}$ and $S_{12}$ are connected in parallel. Buffer diodes $D_{21}$ and $D_{22}$ are connected between the diode $D_{29}$ and the switches $S_{11}$ and $S_{12}$, respectively. Accordingly, transistor $Tr_{16}$ is biased into the ON condition so that a pulse passing through the transistor $Tr_{16}$ will be applied to the preset terminal $Pr_1$ of the D-$FF_1$, when the voltage applied to the base of transistor $Tr_{16}$ is a low level and a pulse voltage passing through the capacitor $C_{13}$ in conjunction with the closing of switches $S_{11}$ or $S_{12}$ is applied to the emitter of transistor $Tr_{16}$. As a result, the program next to the present program is going to be automatically located for normal playback, when the cue key 140 or the review key 139 has been operated without presetting the presettable shift register 219.

The circuit 236 for deactivating the first pulse signal removing circuit 218 is connected to the inverter $I_1$. Circuit 236 includes a time constant circuit and an inverter $I_2$. The time constant circuit includes a resistor $R_{28}$ and a capacitor $C_{18}$ and is connected to the inverter $I_1$. The inverter $I_2$ is connected at its input terminal to the time constant circuit and at its output terminal to the SET terminal of the $FF_0$ of the first pulse signal removing circuit 218 through the capacitor $C_{15}$ and the diode $D_{31}$ in forward direction. The output state of the inverter $I_2$ becomes a high level when one or more of the D-FFs of the presettable shift register 219 has been preset because the circuit 227 is set to the ON condition and the output state of the inverter $I_1$ is a low level at the time. As a result, the first pulse signal removing circuit 218 is deactivated resulting in the malfunction operation of the first pulse signal removing circuit 218 being prevented when any D-FF of the presettable shift register 219 has been preset.

The bypass circuit 226 is connected to the normal playback signal channel. The bypass circuit 226 includes a transistor $Tr_{13}$ which is connected at its collector to the cathode of the diode $D_{14}$ and at its emitter to ground. The base of the transistor $Tr_{13}$ is connected to the $\overline{Q}$ output terminal of the D-FF $FF_D$ of the output-content detection circuit CD. Therefore, when the transistor $T_{r13}$ is switched ON the signal then passing through the normal playback channel is disregarded when the state of the $\overline{Q}$ output terminal of the D-FF $FF_D$ is a high level. As a result, the unrecorded space detection circuit is prevented from indicating a malfunction arising from a signal passing through the normal playback signal channel.

The base of the transistor $Tr_{13}$ is also connected to the power source $+B_1$ through a diode $D_{26}$ in forward direction, a resistor $R_{22}$, and a switch $S_{13}$. Accordingly, the transistor $Tr_{13}$ is switched ON to bypass the signal passing through normal playback signal channel when the switch $S_{13}$ is operated to activate the pulse oscillating circuit. As a result, the pulse oscillating circuit is prevented from indicating a malfunction caused by the signal passing through the normal playback signal channel.

The base of transistor $Tr_{13}$ is also connected to the output terminal of inverter $I_1$, through a resistor $R_{25}$ and a diode $D_{29}$ in the forward direction. Accordingly, the transistor $Tr_{13}$ is switched ON to cause the signal then passing through the normal bypass circuit to be disregarded when the output of the invention $I_1$ is at a high level. This occurs when all of the preset states in the presettable shift register 219 have been shifted to the output-content detection circuit CD. As a result, the unrecorded space detection circuit SD is prevented from indicating a malfunction arising from a signal passing through the normal playback signal channel.

A light-emitting diode $D_{41}$ for indicating normal playback mode is connected at its anode to power source $+B_1$ and at its cathode to ground through the transistor $Tr_{10}$. The base of the transistor $Tr_{10}$ is connected to the Q output terminal of the D-FF $FF_D$ of the output-content detection circuit CD through a resistor $R_{18}$. As a result, the transistor $Tr_{10}$ is switched ON to activate the diode $D_{41}$ when the output state of the Q output terminal of the D-FF $FF_D$ is a high level. Further, the switches $S_{19}$ and $S_{20}$ are interlocked with the fast-forward key 133 (shown in FIG. 1) and the rewind key 135 (shown in FIG. 1) which are connected to the muting signal input terminals of the left and right channel main amplifiers $MA_L$ and $MA_R$ through the buffer diodes $D_{35}$ and $D_{36}$, respectively. The fast-forward key 133 and the rewind key 135 are operated independently or in association with the cue key 140 and the review key 139, respectively. The locking of the cue key 140 or the review key 139 closes switch $S_{19}$ or $S_{20}$, respectively, resulting in the muting of the left and right channel main amplifiers $MA_L$ and $MA_R$.

Another circuit 235 for muting the left and right channel main amplifiers $MA_L$ and $MA_R$ is connected between the $\overline{Q}$ output terminal of the D-FF $FF_D$ of the output-content detection circuit CD and the muting signal input terminals of the left and right channel main amplifiers $MA_L$ and $MA_R$. The muting circuit 235 includes resistors $R_{32}$ and $R_{33}$, a capacitor $C_{17}$, and a buffer diode $D_{37}$. The resistor $R_{32}$, the capacitor $C_{17}$, and the buffer diode $D_{37}$ in the forward direction are connected in series between the Q output terminal of D-FF $FF_D$ and the muting signal input terminals of the left and right channel main amplifiers $MA_L$ and $MA_R$. The resistor $R_{33}$ is connected between the connecting node of the capacitor $C_{17}$, the buffer diode $D_{37}$ and, ground. A pulse having a predetermined time constant, passing through the capacitor $C_{17}$, is applied to the muting signal input terminals of the left and right channel main amplifiers $MA_L$ and $MA_R$, when the output state of the $\overline{Q}$ output terminal of the D-FF $FF_D$ has become a high level. As a result, the left and right channel main amplifiers are also muted for a period from the time the output state of the $\overline{Q}$ output terminal of D-FF $FF_D$ becomes high to the time that the lock operation of the cue key 140 or the review key 139 is finished, in other words, until switch $S_{19}$ or $S_{20}$ is closed.

Indicators 129 and 130 for indicating the fast-forward and rewind operations are also provided. The indicators 129 and 130 are connected between the output terminals of the left and right channel preamplifiers $PA_L$ and $PA_R$ and ground, respectively. The transistors $Tr_{17}$ and $Tr_{18}$ are connected in parallel with indicators 129 and 130, respectively. The bases of transistors $Tr_{17}$ and $Tr_{18}$ are connected to the power source $+B_1$, through the switches $S_{19}$ and $S_{20}$, respectively. Accordingly, when switch $S_{19}$ is closed in connection with the lock of the fast-forward key 137, the indicator 129 is deactivated because the output signal of the left channel preamplifiers $PA_L$ is bypassed by the transistor $Tr_{17}$. Therefore, when the indicator 130 is activated the fast-forward operation is indicated.

When the switch $S_{20}$ is closed by the lock of the rewind key 135, the indicator 130 is deactivated because the output signal of the right channel preamplifier $PA_R$ is bypassed by the transistor $Tr_{18}$. Therefore, indicator 129 is activated and indicates that the rewind operation is to begin. Either one of the signals picked the sensing heads $H_L$ and $H_R$ is applied to the unrecorded space detection circuit SD through one of the preamplifiers $PA_L$ and $PA_R$. During the cue or the rewind operation in the automatic program locating operation, the passing of the unrecorded spaces can be recognized by vanishing of the indications.

FIGS. 4 to 8 illustrate diagrammatical time charts indicating the signal or voltage relationships at the several operations of the circuit shown in FIG. 3.

Figure 4:
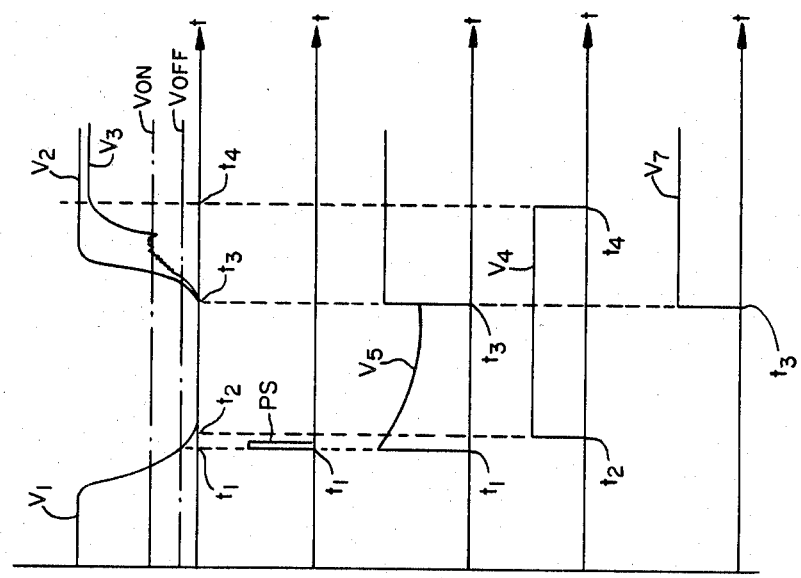

FIG. 4 is the time chart at the time the tape speed changes from the normal playback speed to the fast speed. That is, when an unrecorded space reaches the sensing heads $H_L$ and $H_R$, the D.C. voltage V, from rectifier 213 decreases. A pulse signal PS is generated at time $t_1$, when the D.C. voltage $V_1$ decreases below the lower trigger level, $V_{OFF}$, of the Schmitt circuit 216.

In response to the pulse signal PS, the output state of the $\overline{Q}$ output terminal of the D-FF $FF_D$ of the output-content detection circuit CD assume a high level so that the muting pulse $MP_1$ with a long time constant passing through muting circuit 235 is applied.

FIG. 4 illustrates the timing sequence in the system when the tape speed changes from the normal playback speed to the fast speed during the automatic program locating operation. Referring to FIG. 4, reference letters $V_1$, $V_2$ and $V_3$, represent input signals to the unrecorded space detection circuit SD through the normal playback signal channel, the power source voltage at the limiting amplifier $LA_H$ and the input signal to the unrecorded space detection circuit SD through the cue or the review signal channel, respectively. Reference letters $t_1$, $t_2$, $t_3$, and $t_4$ represent the time the input signal $V_1$ decreases below the lower trigger level $V_{OFF}$ of the Schmitt circuit 216, the time the switch $S_{18}$ is interlocked with the mechanism for locking the cue key 140 or the review key 139, the time switch $S_{11}$ or switch $S_{12}$ is interlocked with the cue key 140 or the review key 139, and the time the switch $S_{18}$ is opened following the completion of one locking cycle for the cue key 140 or the review key.

The pulse signal PS is generated from the unrecorded space detection circuit SD at the time $t_1$. After the time $t_3$, a power source voltage $V_2$ is supplied to the limiting amplifier $LA_H$ of the cue or the review signal channel so that the signal $V_3$ appears. Reference letter $V_4$ represents a voltage supplied to the base of the transistor $Tr_4$ from the power source $+B_1$ through the switch $S_{18}$ during the time from $t_2$ to $t_4$ to prohibit pulse signals from being supplied to presetting shift register 219. Accordingly, all undesired or error pulse signals generated in response to the signal $V_3$ being in a transient state proximate the upper trigger level of the Schmitt circuit 216 are prohibited from being applied to the presettable shift register 219 and from causing the automatic program locating operation to operated erroneously.

Reference letters $V_5$ and $V_6$ represent the muting signals applied to the left and right channel main amplifiers $MA_L$ and $MA_R$ through the muting circuit 235 during the times from $t_1$ to $t_2$ and after $t_3$ when the switch $S_{19}$ interlocked with the fast-forward key 137 or the switch $S_{20}$ is interlocked with the rewind key 135.

Reference letter $V_7$ represents a voltage applied to one of the base of either transistor $Tr_{17}$ or $T_{r18}$ through the switch $S_{19}$ or $S_{20}$ for deactivating one of the indicators 129 and 130. As a result, either indicator 129 or 130 indicates the cue or the review operation.

Figure 5:
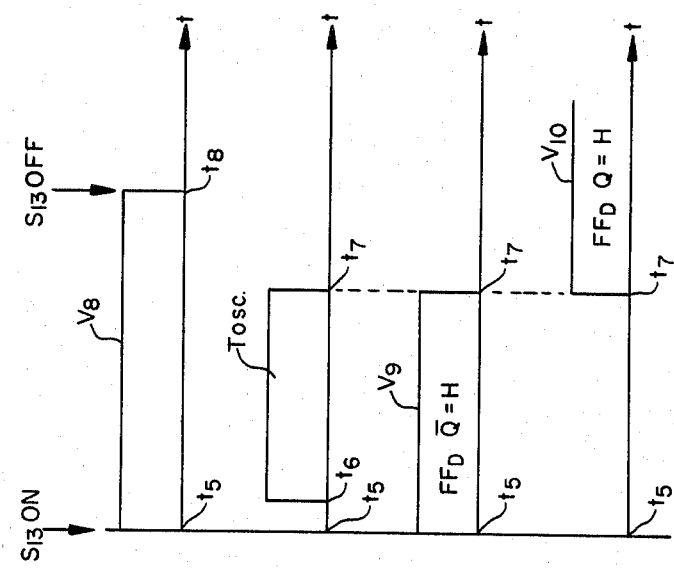

FIG. 5 illustrates the timing sequence initiated when the switch $S_{13}$ is closed. Reference letters $t_5$, $t_6$, $t_7$, and $t_8$ represent the time switch $S_{13}$ is closed, the time the oscillation of the pulse oscillating circuit begins, the time the oscillation is stopped, and the time switch $S_{13}$s is opened, respectively. The oscillation begins at the time $t_6$ about 100 msec after the time $t_5$, and it stops at the time $t_7$ when the contents of D-FF $FF_D$ of the output content detection circuit CD changes from the RESET state to the SET state. Therefore, the switch $S_{13}$ must remain closed until the oscillation stops.

Reference letter $V_8$ represents the voltage at the emitter of the transistor $Tr_{14}$. Reference $T_{osc}$ represents the oscillation term. Reference letters $V_9$ and $V_{10}$ represent the voltage levels at the Q and $\overline{Q}$ output terminals of the D-FF $FF_D$. Transistor $Tr_{12}$ of the bypass circuit 226 is activated by the voltage $V_9$ and transistor $Tr_{11}$ of the pulse oscillating circuit 223 is activated by the voltage $V_{10}$.

FIG. 6 illustrates the timing sequence initiated by the activation of switch $S_{15}$. Reference letters $t_9$, $t_{10}$, and $t_{11}$ represent the closing of switch $S_{15}$, the time pulse signal applied to first pulse removing circuit 218 after the predetermined period that the flip-flop $FF_0$ of first pulse signal removing circuit 218 is kept reset by the pulses passing through the capacitor $C_9$, and the time the SET state of the D-FF of the presettable shift register 219 nearest to the D-FF $FF_D$ of output-content detection circuit CD is shifted to D-FF $FF_D$. Reference letter $V_{11}$ represents the pulse supplied to the clear terminal CL of the flip-flop $FF_0$ through the capacitor $C_9$. Reference letters $PS_e$, $PS_1$, $PS_n$ represent the pulse signals generated by unrecorded space detection circuit SP. Pulse signals $PS_1$, $PS_n$ $PS_{n+1}$ are generated for every unrecorded space. On the other hand, pulse signal $PS_e$ is generated at the time the heads $H_L$ and $H_R$ are decoupled from the type T during the tape speed changing cycle. Reference letters $V_{12}$ and $V_{13}$ represent the voltage or the level of the $\overline{Q}$ output terminal of the flip-flop $FF_0$ and the voltage or level of the $\overline{Q}$ output terminal of the D-FF $FF_D$ of the output content detection circuit CD. Voltage $V_{12}$ appears in response to the error pulse signal $PS_e$. Voltage $V_{13}$ appears at the time $t_9$, and then disappears at the time $t_{11}$ and the nth pulse signal $PS_n$ results in the SET state of the D-FF $FF_1$ of the presettable shift register 219 being shifted to the D-FF $FF_D$ of the output-content detection circuit CD.

FIG. 7 is a time chart illustrating the timing sequence initiated by the closing of switch $S_{14}$. Reference letter $t_{12}$ represents the time that reset switch $S_{14}$ is closed. Reference letters $V_{14}$ and $V_{15}$ represent the voltage level of the Q output terminal of the D-FF $FF_D$ of the output-content detection circuit CD and the pulse applied to the SET terminal of the D-FF $FF_D$ from the inverter $I_1$ through the capacitor $C_{14}$. Voltage $V_{14}$ biases the transistor $Tr_{13}$ into the ON condition to block the playback signal from being supplied to the unrecorded space detection circuit SD. Pulse $V_{15}$ has a gentle trailing edge so that the pulse $V_{15}$ or the set voltage of the D-FF $FF_D$ prevents the RESET state of the D-FF $FF_1$ of the presettable shift register 219 being shifted to the D-FF $FF_D$ of the output content detection circuit CD in response to a pulse signal PS generated by the unrecorded space detection circuit SD during the tape speed changing from the fast speed to the normal playback speed.

FIG. 8 illustrates the timing sequence initiated by the closing of switches $S_{10}$ to $S_1$. Reference letter $t_{13}$ represents the time any one of the present switches $S_{10}$ to $S_1$ is closed. Reference letter $V_{16}$ represents a pulse applied to the SET terminal of the flip-flop $FF_0$ of the first pulse signal removing circuit 218 from the inverter $I_2$ through the capacitor $C_{15}$. Voltage $V_{16}$ deactivates the first pulse signal removing circuit 218.

Figure 9B:
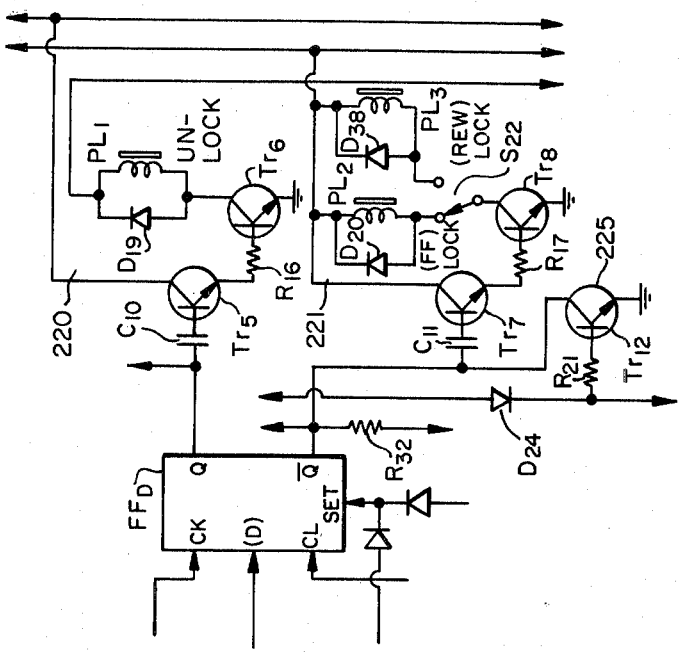
FIG. 9 illustrates alternate embodiments of the control circuit of FIG. 3.
Figure 9A:
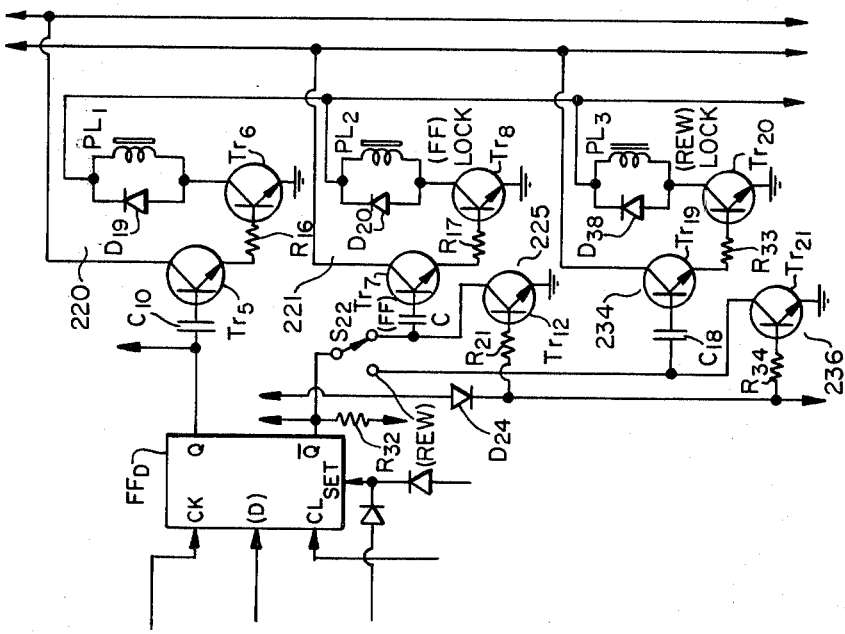

FIGS. 9a and 9b show other tape speed shifting circuits interchangeable with the circuit of FIG. 3, respectively. The circuits shown in FIGS. 9a and 9b are provided with tape speed shifting circuits which can shift the tape speed from the normal playback speed to the fast speed in the forward direction and the reverse direction.

FIG. 9a illustrates the second and third tape speed shifting circuits 221 and 236 for changing the tape speed to the fast speed in addition to the first tape speed shifting circuit 220 for changing the tape speed to the normal playback speed. These tape speed shifting circuits 220, 221, and 234 are individually the same as the first or second tape speed shifting circuit 220 or 221 of FIG. 3. The first tape speed shifting circuit 220 is connected to the Q output terminal of the D-FF $FF_D$ of the output-content detection circuit CD. The second and third tape speed shifting circuits 221 and 234 are connected to the $\bar{Q}$ output terminal of the D-FF $FF_D$ through the single pole double throw switch $S_{22}$. When the manually operated switch $S_{22}$ is connected to the side of second tape speed shifting circuit 220, plunger $PL_2$ is activated by the high level voltage of the $\bar{Q}$ output terminal of the D-FF $FF_D$, resulting in the tape speed shifting mechanism being interlocked with the plunger $PL_2$ to lock the cue key 140 (shown in FIG. 1) into the operating position. On the other hand, when switch $S_{22}$ is connected to the side of the third tape speed shifting circuit 234, the plunger $PL_3$ is activated by the high level voltage of the $\bar{Q}$ output terminal of the D-FF $FF_D$, resulting in another tape speed shifting mechanism being interlocked with the plunger $PL_3$ to lock the review key 139 into the operating position.

FIG. 9b illustrates in detail the first and second tape speed shifting circuits 220 and 221, however, the second tape speed shifting circuit 221 includes two plungers $PL_2$ and $PL_3$, respectively, interlocked with the tape speed shifting mechanisms for locking the cue key 140 and the review key 139 into respective operating positions. The plungers $PL_2$ and $PL_3$ are connected to the collector of the transistor $Tr_8$ through a manually operated single pole double throw switch $S_{22}$. When the switch $S_{22}$ is connected to the side of plunger $PL_2$, the plunger $PL_2$ is activated to result in the tape speed shifting mechanism being interlocked with the plunger $PL_2$ to lock the cue key into the operating position. On the other hand, when the switch $S_{22}$ is connected to the side of the plunger $PL_3$, the plunger $PL_3$ is activated to result in another tape speed shifting mechanism being interlocked with the plunger $PL_3$ to lock the review key into the operating position. As a result, either programs located after or before the program presently played back can be selected as the next desired program by the selective setting of the switch $S_{22}$.

FIG. 10 shows one embodiment of the tape speed shifting mechanism for locking the cue key 140 or the review 139 key into the operating position. The mechanism includes the gears $G_1$, $G_2$, $G_3$ and $G_4$, a cam C, and a lever L. The gear $G_4$ is continuously driven by a motor (not shown). The gear $G_2$ and the cam C are operated from the gear $G_4$. The gears $G_1$ and $G_3$ are fixed coaxially with each other and are interlocked with the plunger $PL_2$. When the plunger $PL_2$ is activated, the gears $G_1$ and $G_3$ are moved to the position where the gear $G_3$ engages with the gear $G_4$, and the gear $G_1$ engages with the gear $G_2$. The gear $G_4$ drives the gear $G_3$ clockwise so that the gear $G_1$ drives the gear $G_2$ counterclockwise. Accordingly, the cam C swings the lever L around the pivot P against the spring S, resulting in the lever L to move the rod $P_1$ to position the cue key 140 or the review key 139 into the locked position. The switch $S_{18}$ of FIG. 3 is interlocked with the lever L so that the switch $S_{18}$ is closed during some part of one rotation of the gear $G_2$.

What is claimed is:

1. In a recording tape reproduction apparatus wherein the tape includes recorded programs separated by unrecorded spaces such that an unrecorded space separates each successive recorded program, a tape control system for selecting and locating any number of programs to be reproduced at a tape playback speed and for initiating a tape bypass speed faster than the tape playback speed for passing by one or more non-selected programs at a high rate, said system comprising:

means for sensing said recorded programs and said unrecorded spaces on said tape and for generating space detection signals in response to said sensed unrecorded spaces;

shift register means coupled to said sensing and generating means and including a plurality of successive bit stages, each said bit stage associated with a corresponding one of said recorded programs, for receiving said space detection signals and for progressively shifting the content of each of said bit stages to the next successive bit stage in response to receipt of said space detection signals;

means for selectively presetting a plurality of said bit stages to a predetermined value to select for reproduction the plurality of recorded programs associated with said plurality of present bit stages; and means for receiving the content of the last bit stage in said shift register means responsive to the shifting of said shift register means and for sensing when said received content is equal to said predetermined value to permit the selected programs to be reproduced at said tape playback speed and when said received content is not equal to said predetermined value to permit said apparatus to operate at said tape bypass speed.

2. A tape control system according to claim 1 wherein said receiving and sensing means comprises a D flip-flop having a set terminal and an output terminal.

3. A tape control system according to claim 2 wherein said shift register means includes an output terminal and each of said bit stages of shift register means includes an associated preset terminal, and wherein said presetting means comprises a plurality of preset circuits, each said preset circuit being associated with a different one of said bit stages and being connected to said preset terminal of said associated bit stage, each said preset circuit including a preset switch for initiating the presetting of said associated bit stage to said predetermined value.

4. A tape control system according to claim 3 wherein each said preset switch associated with each said bit stage has an input pole connected to said power source and an output pole, and wherein said preset circuit further includes a preset diode connected to said preset terminal of said associated bit stage, and a preset resistor connected between said preset diode and said output terminal of said preset switch, said preset switch when closed connecting said power source to said preset resistor and preset diode to enable the presetting of said associated bit stage to said predetermined value and when in an open condition inhibiting the presetting of said associated bit stage.

5. In a recording tape reproduction apparatus wherein the tape includes recorded programs separated by unrecorded spaces such that an unrecorded space separates successive recorded programs, a tape control system for selecting and locating programs to be reproduced at a tape playback speed and for initiating a tape bypass speed faster than the tape playback speed for passing by non-selected programs at a high rate, said system comprising:
means for sensing said recorded programs and said unrecorded spaces on said tape and for generating space detection signals in response to said sensed unrecorded spaces, said sensing and generating means comprising:
a sensing head selectively coupled to said tape to generate output signals corresponding to said recorded programs or null signals corresponding to said unrecorded spaces; and
an unrecorded space detection circuit for receiving said output signals and said null signals and for generating said space detection signals in response to said null signals;
shift register means coupled to said sensing and generating means and including a plurality of successive bit stages, each said bit stage associated with a corresponding one of said recorded programs, for receiving said space detection signals and for progressively shifting the content of each of said bit stages to the next successive bit stage in response to receipt of said space detection signals;
means for selectively presetting one or more of said bit stages to a predetermined value to select for reproduction the recorded program associated with each preset bit stage; and
means for receiving the content of the last bit stage in said shift register means responsive to the shifting of said shift register means and for sensing when said received content is equal to said predetermined value to permit each selected program to be reproduced at said tape playback speed and when said received content is not equal to said predetermined value to permit said apparatus to operate at said tape bypass speed.

6. A tape control system according to claim 5 further including an inhibit circuit coupled between said sensing and generating means and said shift register means for receiving said space detection signals and for inhibiting the transfer of the first of said space detection signals to said shift register means.

7. A tape control system according to claim 6 wherein said inhibit circuit includes a gate circuit having an input terminal connected to said detection circuit, an output terminal connected to said shift register, and a biasing circuit having a control terminal coupled to said gate circuit and an input terminal connected to said detection circuit for biasing said gate circuit into an ON condition in response to the reception of the first of said space detection signals.

8. A tape control system according to claim 7 further including a power source and a flip-flop wherein said gate circuit comprises a diode and wherein said biasing means includes a transistor having a collector coupled to said control terminal and an emitter coupled to ground, a resistor connected between said control terminal and said power source for applying a forward voltage to said diode and to said transistor, said flip-flop having a CK terminal connected to said detection circuit for receiving the first of said space detection signals and an inverted output terminal connected to the base of said transistor.

9. In a recording tape reproduction apparatus wherein the tape includes recorded programs separated by unrecorded spaces such that an unrecorded space separates successive recorded programs, a tape control system for selecting and locating programs to be reproduced at a tape playback speed and for initiating a tape bypass speed faster than the tape playback speed for passing by non-selected programs at a high rate, said system comprising:
means for sensing said recorded programs and said unrecorded spaces on said tape and for generating space detection signals in response to said sensed unrecorded spaces;
shift register means coupled to said sensing and generating means and including a plurality of successive bit stages, each said bit stage associated with a corresponding one of said recorded programs, for receiving said space detection signals and for progressively shifting the content of each of said bit stages to the next successive bit stage in response to receipt of said space detection signals;
an inhibit circuit coupled between said sensing and generating means and said shift register means for receiving said space detection signals and for inhibiting the transfer of the first of said space detection signals to said shift register means;
means for selectively presetting one or more of said bit stages to a predetermined value to select for reproduction the recorded program associated with each preset bit stage; and
means for receiving the content of the last bit stage in said shift register means responsive to the shifting of said shift register means and for sensing when said received content is equal to said predetermined value to permit each selected program to be reproduced at said tape playback speed and when said received content is not equal to said predetermined value to permit said apparatus to operate at said tape bypass speed.

10. A tape control system according to claim 9 wherein said tape is adapted to pass said sensing and generating means in a forward or a reverse direction and wherein said system further includes a first switch for selecting said forward or reverse direction of said tape and for initiating the operation of said inhibit circuit responsive to the selection of said reverse direction.

11. A tape control system according to claim 10 further including a second switch for initiating a pause in the movement of said tape and wherein said inhibit circuit is set into a non-operating condition in response to the actuation of said second switch.

12. A tape control system according to claim 11 further including a third switch for initiating the driving of said tape at a high speed wherein said inhibit circuit is set into a non-operating condition in response to the actuation of said third switch.

13. A tape control system according to claim 12 further including a fourth switch for setting said inhibiting circuit into a non-operating state in response to the presetting of said shift register.

14. A tape control system according to claim 1 5, or 9 wherein said shift register includes an input terminal and wherein said system further comprises a pulse generating means connected to said input terminal of said shift register for supplying at least one pulse to said shift register and a controller connected between receiving means and said pulse generating means for deactivating said pulse generating means in response to an output from said shift register means.

15. A tape control system according to claim 14 wherein said pulse generating means includes a Schmitt circuit having an input terminal and an output terminal and a positive feedback means connected between said output and said input terminals of said Schmitt circuit.

16. A tape control system according to claim 15 wherein said positive feedback means includes a transistor having a base connected to the output terminal of said Schmitt circuit, a collector connected to said power source, and an emitter connected to the input terminal of said Schmitt circuit and ground through said controller.

17. A tape control system according to claim 14 wherein said receiving and sensing means comprises a D flip-flop having a set terminal and an output terminal.

18. A tape control system according to claim 17 wherein said controller comprises a transistor having a collector connected to the emitter of said transistor of said positive feedback means, an emitter connected to the ground, and a base connected to the output terminal of said D flip-flop.

19. A tape control system according to claim 17 further comprising a setting circuit connected between said shift register means and said set terminal of said D flip-flop for setting said receiving and sensing means into a predetermined state to permit a said selected program to be reproduced at said tape playback speed when none of said bit stages are set to said predetermined state.

20. A tape control system according to claim 19 wherein each of said bit stages includes an output terminal and wherein said setting circuit includes a plurality of pairs of preset diodes and resistors, each said pair of diodes and resistors being associated with a different one of said bit stages and being connected between the output terminal of said associated bit stage and said power source, and a plurality of switching circuits each said switching circuit being associated with a different one of said pairs of setting diodes and resistors and being connected between said associated pair of setting diodes and resistors and said set terminal of said D flip-flop.

21. In a recording tape reproduction apparatus wherein the tape includes recorded programs separated by unrecorded spaces such that an unrecorded space separates successive recorded programs, a tape control system for selecting and locating programs to be reproduced at a tape playback speed and for initiating a tape bypass speed faster than the tape playback speed for passing by non-selected programs at a high rate, said system comprising:

means for sensing said recorded programs and said unrecorded spaces on said tape and for generating space detection signals in response to said sensed unrecorded spaces;

means coupled to said sensing and generating means and receiving said space detection signals for storing a sequence of designations associated with said recorded programs on said tape and for outputting said designations in succession in response to said space detection signals, each said designation having a first value indicating an associated recorded program selected for reproduction or a second value indicating an associated recorded program to be bypassed;

means for selectively presetting a plurality of said designations to said first value to select for reproduction said recorded programs associated with each of said designations having said first value; and means for receiving said successively outputted designations and for sensing when a said received designation is equal to said first value to permit said selected program to be reproduced at said tape playback speed and when said received designation is equal to said second value to permit said apparatus to operate at said tape bypass speed.

* * * * *